(12) United States Patent
Kuhs

(10) Patent No.: US 8,773,072 B2
(45) Date of Patent: Jul. 8, 2014

(54) REFUELABLE STORAGE BATTERY

(75) Inventor: Bernd Kuhs, Bettingen (CH)

(73) Assignee: Aygis AG, Mellingen (CH)

( * ) Notice: Subject to any disclaimer, the term of this patent is extended or adjusted under 35 U.S.C. 154(b) by 318 days.

(21) Appl. No.: 13/219,761

(22) Filed: Aug. 29, 2011

(65) Prior Publication Data

US 2013/0049692 A1   Feb. 28, 2013

(51) Int. Cl.
*H02J 7/00* (2006.01)

(52) U.S. Cl.
USPC ........................................ 320/127

(58) Field of Classification Search
USPC ........................................ 320/127
See application file for complete search history.

(56) References Cited

U.S. PATENT DOCUMENTS

| | | | |
|---|---|---|---|
| 3,238,070 A | 3/1966 | Porter, II | |
| 3,414,437 A | 12/1968 | Doundoulakis et al. | |
| 4,207,382 A | 6/1980 | Zaromb | |
| 5,879,828 A | 3/1999 | Debe et al. | |
| 6,270,925 B1 | 8/2001 | Takada et al. | |
| 2003/0068888 A1* | 4/2003 | Kodera et al. | 438/687 |
| 2004/0234566 A1* | 11/2004 | Qiu et al. | 424/401 |
| 2006/0035152 A1* | 2/2006 | Nishimura et al. | 429/234 |
| 2007/0117025 A1* | 5/2007 | Ikuta et al. | 429/246 |
| 2007/0187858 A1 | 8/2007 | Kuhs | |
| 2010/0047671 A1 | 2/2010 | Chiang et al. | |
| 2010/0291429 A1 | 11/2010 | Farmer | |

FOREIGN PATENT DOCUMENTS

| | | |
|---|---|---|
| CA | 2 483 894 | 4/2003 |
| DE | 2620792 | 5/1976 |
| DE | 69722528 | 5/2004 |
| DE | 69837156 | 11/2007 |
| DE | 10 2007 061 618 | 6/2009 |
| EP | 0330290 | 8/1989 |
| EP | 0 880 187 | 5/1998 |
| EP | 1808241 | 7/2007 |
| WO | 0103221 | 1/2001 |
| WO | 0189012 | 11/2001 |
| WO | 03/092138 | 11/2003 |
| WO | 2009077049 | 6/2009 |
| WO | 2009151639 | 12/2009 |

* cited by examiner

*Primary Examiner* — Arun Williams
(74) *Attorney, Agent, or Firm* — Volpe and Koenig, P.C.

(57) ABSTRACT

A reversible storage system for electric energy, including charging or discharging surfaces as a positive collector terminal and a charging or discharging area as a negative collector terminal and a flow electrode with a pumpable dispersion with particles storing electric energy and at least one supply line and at least one drain line for the pumpable dispersion. The pumpable dispersion includes particles storing electric energy in a capacitive and/or chemical fashion, having an average grain size distribution: 1 nM to 500 μm. For chemically storing particles, the negative and the positive collector terminals have a planar shape with a single exterior closed border and with their planar sides each contacting an ion-selective diaphragm or spacers, and the pumpable dispersion is arranged on a side facing away from the planar side of the respective collector, contacting the ion-selective diaphragm or spacers, and the dispersion at least partially penetrates the respective collector.

16 Claims, 3 Drawing Sheets

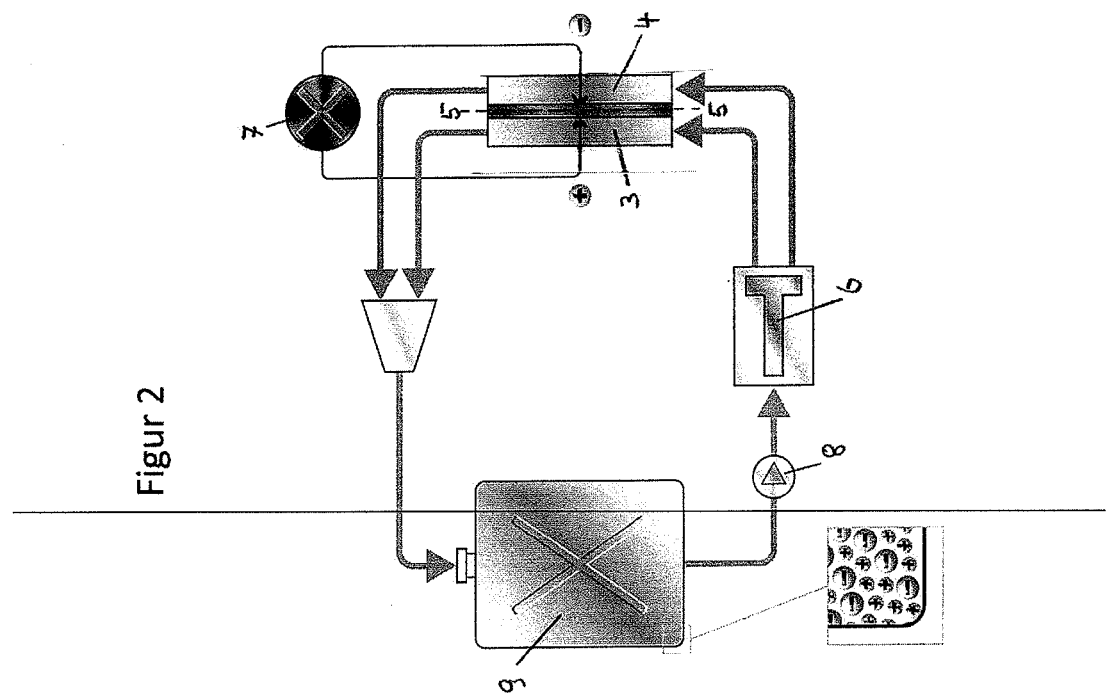
Figur 2
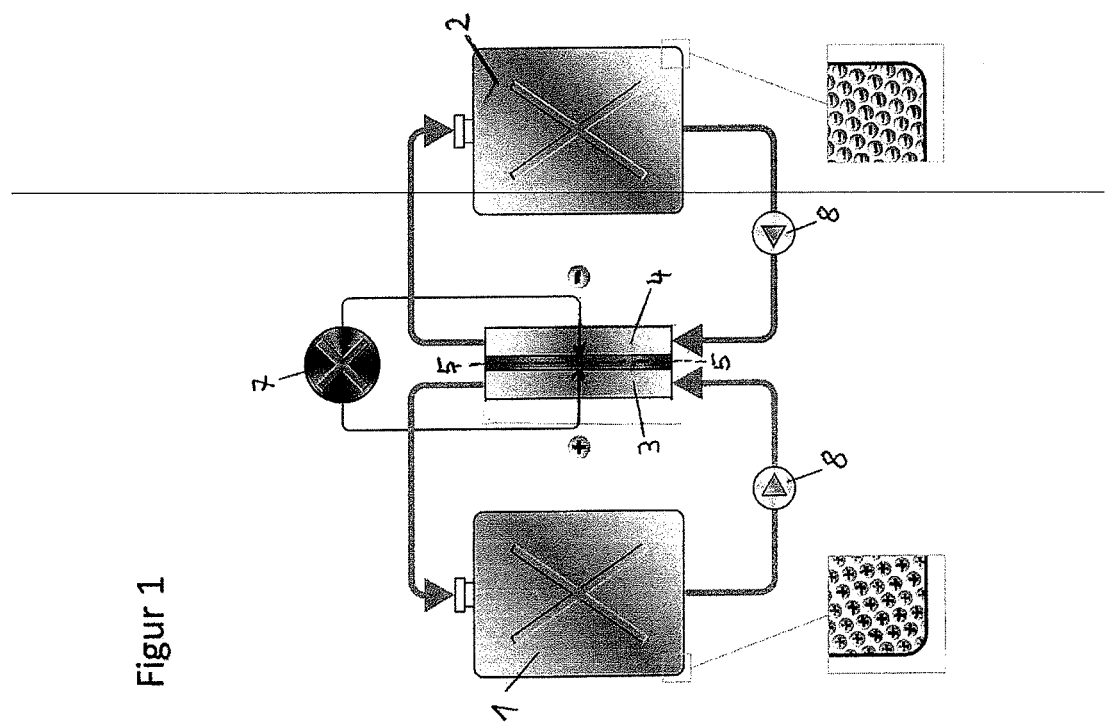
Figur 1

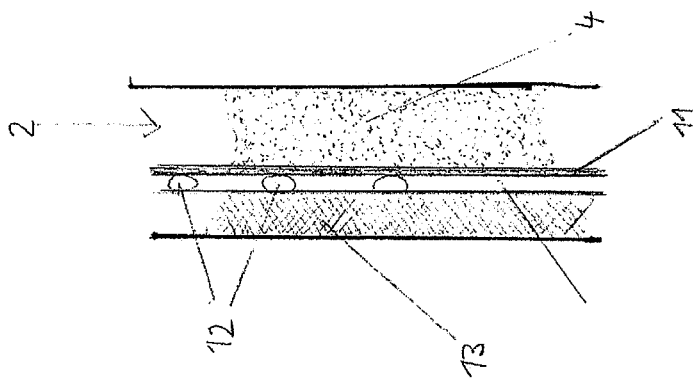
Figur 5
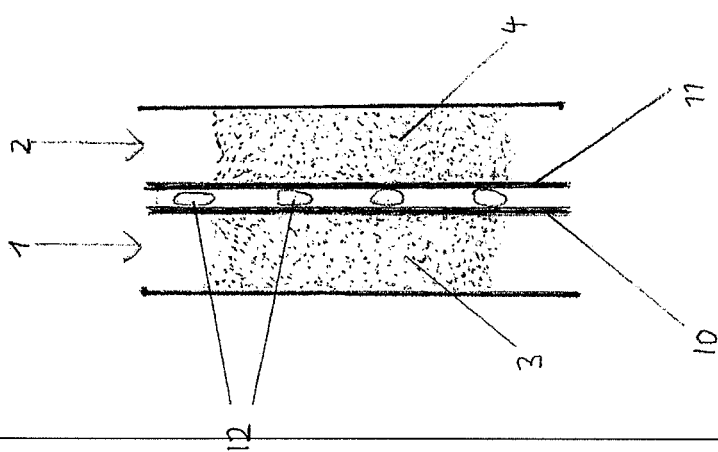
Figur 4
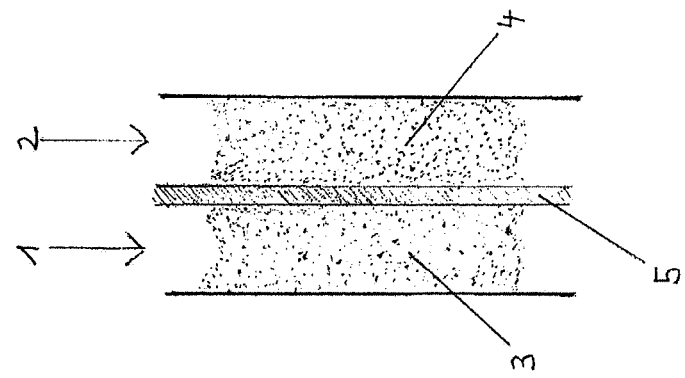
Figur 3

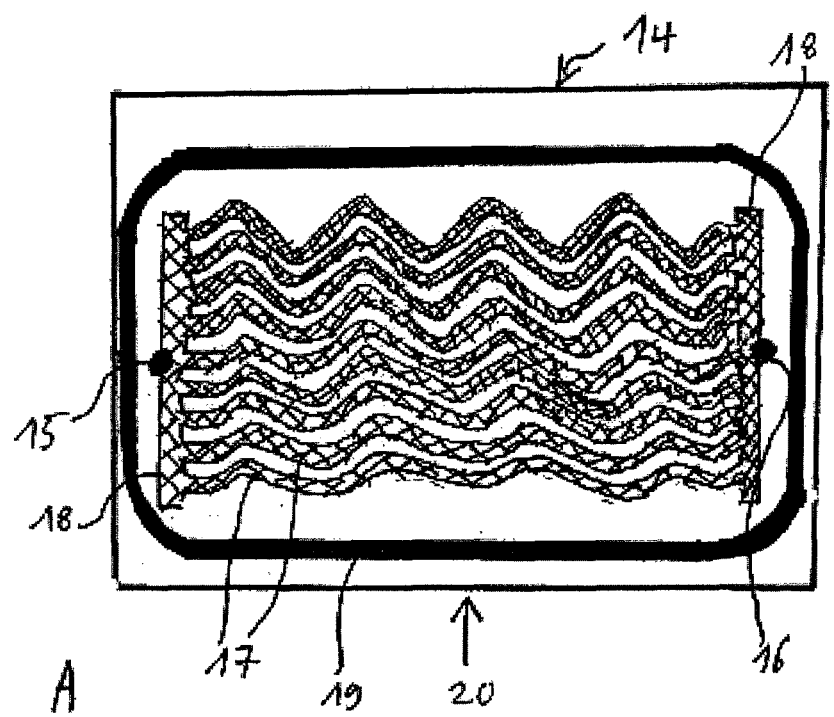
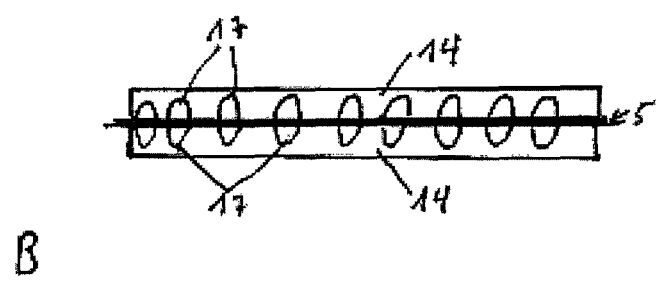
Fig. 6

REFUELABLE STORAGE BATTERY

BACKGROUND

The invention relates to a reversible storage system for electric energy, comprising a charging or discharging surface as the positive collector terminal and a charging or discharging surface as the negative collector terminal and a flow electrode with a pumpable dispersion comprising particles storing electric energy and at least one feed line and at least one drain line for the pumpable dispersion, as well as preferably a reservoir for the pumpable dispersion, corresponding dispersions, and methods, as well as other embodiments of the invention connected thereto.

Battery systems for storing electric energy via liquid media that can be pumped are known per se. Such a device is described, for example, in WO 01/03221, with this device comprising at least the following components: (a) a redox flow cell comprising (i) an anode in a catholyte chamber, (ii) a cathode in an anolyte chamber, and (iii) an ion-permeable diaphragm between these chambers; (b) two electrolyte containers, one container each for the cathode liquid (here also called positive electrode material, "catholyte-liquid" or "catholyte") and a container for the anode liquid (here also called negative electrode material, "anolyte-liquid" or "anolyte"), as well as (c) a pumping system, which ensures the circulation of the cathode liquid and the anode liquid from the containers to the flow cell and back to the containers.

The principle of the flow cell according to WO 01/03221, which is also known as redox-flow cell, is based on the reduction and oxidation reaction of liquid electrolytes. According to WO 01/03221 they essentially comprise metallic salts dissolved in aqueous media. The cathode-liquid and the anode-liquid are pumped via a pump through the chambers of the flow cell, in which the respective electrodes are present. The electrodes typically comprise graphite/composite materials, with here graphite felts being used in order to increase the active surface and thus the power density. The two chambers, i.e. the catholyte chamber and the anolyte chamber, which are also called semi-cells, are separated by an ion-conductive diaphragm. Similar to fuel cells, the individual cells can also be switched serially to form a stack. Here, the electrodes acts as bipolar electrodes and the electrolyte flow occurs in parallel. Individual stacks can be electrically interconnected like conventional batteries, either parallel or serially in order to obtain the desired voltage.

A particular feature of this technology comprises that by the separation of the energy converter (i.e. the redox flow cell) and the storage medium (i.e. the two electrolyte containers) energy and power can be scaled independently from each other. Here, the amount of electrolytes determines the energy to be stored and the size of the active electrode surfaces determines the power of the battery. Due to the fact that the electrolytes are stored separated from the converter, practically no self-discharge occurs when the arrangement is idling. It only occurs when electrolytes are pumped through the cells.

The charged liquids (catholyte and anolyte) of the flow cells of prior art comprise dissolved metallic salts, which show a limited solubility so that this limits the energy density. The energy density of flow cells of prior art and/or redox-flow cells amounts to approximately 30-50 Wh/kilogram (kg), which is hardly more than achievable by conventional lead-acid batteries. Additionally, the aqueous electrolyte solutions lead to precipitations at and corrosion of conductive parts. Thus, the redox-flow cell allows the storage and refilling of electric energy in a liquid form, however for example vehicles must carry a much larger amount of liquid in order to travel an appropriate distance.

US 2010/0047671 describes how, instead of solutions of electrolytes, in an appropriate manner dispersions of particles, which may also include electrolytes, can act as anolytes and/or catholytes in respective flow chambers. However, in the examples shown a strong internal resistance must be expected, because the conductive electrolytes (collectors) are arranged far apart from each other.

Batteries in the form of static storage systems for electric energy are also known, such as lithium batteries (Li-batteries). Such a battery is described for example in EP 0 880 187 B1 and comprises the following components: (a) an anode material on a collector film, (b) a cathode material on a collector film, (c) an ion-permeable separator film, as well as (d) an anhydrous electrolyte solution.

In the Li-battery the anode material and the cathode material are each applied on an electrically conductive collector film. Both films are separated from each other by an ion-conductive separator film and immersed in an electrolyte solution. In order to allow storage surfaces as large as possible in a small volume, these films are wound or folded.

In the Li-battery an energy density of 140 Wh/kg is achieved by the electrochemical elements included, which is only sufficient for a driving range of approx. 130 miles (200 km) in an average passenger vehicle. Additionally, Li-batteries are very expensive by the complicated production of the storage films they comprise and can easily be destroyed by exterior influences. For example, if vibrations lead to a damage of the integrated film, this may lead to short circuiting and thus to the destruction of the cells. A destruction of the cells can also occur by an excessively fast charging or discharging process when the thin films burn through, for example. Many materials for electrodes, which might lead to a higher storage capacity, cannot be used because they cannot be sufficiently fixed on the carrier film. For example, when silicon is used as the anode material it would lead to a ten-fold higher storage capacity than the relatively frequently used graphite; however, the volume of silicon increases considerably during the charging process so that it cannot be fixed permanently on the carrier film. The storage capacity of conventional batteries is also limited by the structural size of the cells. Additionally, a single charging process takes several hours.

Further, capacitors are known for the storage of electric energy, particularly electrolyte capacitors and double-layer capacitors. Capacitors comprise two electrolytes with their distance being as short as possible and with an area of non-conductive, insulating features being therebetween (dielectric). In an electrolyte capacitors, also called "elco", a non-conductive insulating layer is created on the metal of the anode electrode by way of electrolysis, which forms the dielectric of the capacitors. The electrolyte forms the cathode (counter-electrode). It may comprise a liquid or a pasty electrolyte (ion conductor) or a solid electrolyte (electron conductor). Most recent developments are the polymer-electrolytes. It is distinguished between three types of design, which include as the dielectric (a) aluminum oxide, (b) tantalum-oxide, or (c) niobium-pentoxide.

Double-layer capacitors are also known (e.g., trade names Gold Cap, Supercap, Ultra Cap, Boost Cap). They are characterized in a high energy density. Their relatively high capacity is based on the dissociation of ions in a liquid electrolyte, which form a thin dielectric of a few atomic layers at the boundary layer to the electrodes. The principle of energy storage in the electro-chemical double-layer (Helmholtz-layer) is known per se. The relatively high capacity is based on the low thickness of the double layer. Frequently, carbon is used as the material of the electrodes in various modifications: Aqueous electrolyte solutions can be used as electrolytes, however, primarily organic electrolytes are used based on quaternary salts, such as tetra ethyl ammonium borofluoride (TEABF), dissolved in acetonitrile or propylene carbonate. Organic electrolytes allow a cell voltage of typically 2.5 V. Aqueous electrolytes, such as potassium hydroxide (KOH) or sulfuric acid ($H_2SO_4$) have a nominal voltage of maximally 1.2 V, however, due to the considerably lower interior resistance they have a higher capacity. The design of double-layer capacitors differs only slightly from that of batteries. They primarily relate to mono-polar arrangements, in which the electrodes are wound or stacked.

Capacitors, particularly double-layer capacitors also used as energy storage for electric energy due to their higher energy capacity, are limited with regards to their capacity due to the statically arranged charge carriers (wound films). Presently, double-layer capacitors only achieve an energy density of 4-20 Wh/kg.

SUMMARY

The objective according to the invention comprises increasing the energy density of existing electric energy storage media, such as the ones described above, lower their production costs (considerably), avoid problems such as an excessive interior resistance, and/or considerably simplify charging and handling by using improved liquid storage media and/or flow cells. The objective is to allow vehicles to fill their tanks in an economical fashion and within minutes at refueling stations, similar to the process used presently for fossil fuels.

This objective is attained by particular materials being used as energy carriers and the additional features of the invention implemented as described in the following.

Now it has been found that it is possible to produce liquid media that can be pumped in the form of a cathode-liquid and an anode-liquid and to use them in the energy storage devices described in the following with flow cells in (rechargeable) batteries (predominantly electro-chemical), for example the Li-battery, as well as capacitive, particularly based on the double-layer capacitor principle, as positive and/or negative electrode materials, with the particles (charge carriers) positive and negative in reference to each other being dispersed in a carrier liquid, which represents an electrolyte solution. The "charged" electrode materials (positive electrode material=cathode-liquid and negative electrode material=anode-liquid) used according to the invention are present in a dispersion (preferably suspension), which includes the dispersed particles as storage materials (charge carriers). Here, the active surface of the dispersed storage materials, i.e. the charge carriers, is considerably enlarged. Using such a dispersion, in the devices and methods described the following and in the claims electric current can be generated in an excellent manner, achieving considerably higher energy densities with simultaneously considerably reduced production costs and clearly simplified production and handling as well (particularly in the embodiments (B) and their preferred variants) lower internal resistance. Any known cathode and anode material is suitable as the charge carrier with a preferred average grain size distribution ranging from (approximately) 1 nm (nanometer) to (approximately) 500 μm (micron). Known liquids and/or electrolytes are suitable as carrier liquids for all these applications. In this sense, according to the invention, static energy storage media known per se, such as batteries and capacitors, are embodied as non-static systems, in which the storage of the electric energy occurs in a liquid storage medium that can be stored, tanked, and refilled by way of pumping.

The invention is defined in the present description and particularly in the claims, which are hereby included by reference.

The invention relates, particularly in an embodiment (A), to a reversible storage system for electric energy mentioned at the outset (in the following also called energy storage system), characterized in that the particles storing electric energy show an average grain size distribution from 1 nm to 500 μm and the electric energy is capacitively stored at least partially in Helmholtz-double layers, and both charging or discharging surfaces are in contact with the pumpable dispersion, with one of the charging or discharging surfaces coming in to contact with the particles and being embodied such that the charge stored inside the particles is transferred thereto while the other discharging surface accepts the opposite charge of the shell of the particles.

In another particular embodiment (B) the invention relates, similarly to the above-mentioned embodiment, to a reversible storage system for electric energy, comprising a charging or discharging surface as the positive collector terminal and a charging or discharging surface as a negative collector terminal and a flow electrode with a pumpable dispersion, said dispersion comprising particles storing the electric energy (capacitively and/or chemically), with these particles having an average grain size distribution from 1 nM to 500 μm, and comprising at least one feed line and at least one drain line for the pumpable dispersion, with the storage system further comprising, for separating the positive and negative collector terminals, at last one ion-permeable diaphragm or at least one non-conductive spacer, with a positive electrode material (catholyte or cathode-liquid) being in contact with the positive collector terminal and a negative electrode material (anolyte or anode-liquid) with the negative collector terminal, and with each flow electrode of said positive or negative electrode materials being included in the form of an appropriate (=appropriately charged or to be charged) pumpable dispersion, said electrode material forming, together with the other wall sections of the flow electrode and
  (i) the respective collector and the ion-permeable diaphragm, or
  (ii) when instead thereof a non-conductive spacer is provided, with the respective positive collector terminal or with the respective negative collector terminal, and the at least one supply line and the at least one drain line forming a cathode and/or anode flow electrode (cathode and/or anode chamber), wherein the ion permeable diaphragm or, when spacers are used, the contacting collector is permeable towards the side of the spacers, not for the particles of the pumpable dispersion but for electrolytes, and wherein the positive and the negative electrode material is arranged parallel in reference to the ion-permeable diaphragm or parallel in reference to the arrangement of the spacers and parallel in reference to each other and are arranged on opposite planar sides of the ion-permeable diaphragm or opposite sides of the arrangement of the spacers such that on one side of the ion-permeable diaphragm or on the same side of the spacers only at least one positive electrode material and at least one positive collector terminal and on the opposite side only at least one negative electrode material and one negative collector terminal are provided, characterized in that the negative collector terminal and the positive collector terminal each have a planar form (for example completely planar or equipped with corrugations, pores, channels, bends, or folds, or two or more of these features) with a single exterior closed border (particularly without any connection for example between two opposite edges to a cylinder or box) and that the negative collector terminal and the positive collector terminal contact with one of their planar sides each the ion-selective diaphragm or the spacers, and that the pumpable dispersion is arranged on the side facing away from the planar side of the respective collector contacting the ion-selective diaphragm or the spacers, wherein the pumpable dispersion (optionally) may penetrate at least partially into the respective collector, wherein optionally in said storage system preferably at least one additional container ("electrolyte container") is provided, comprising at least one of the pumpable dispersions, with a liquid transportation device and connection means being provided for transporting the pumpable dispersion from the container to at least one feed line and from at least one drain line of the respective flow electrode and back to the electrolyte container (pump system).

At least one flow electrode (cathode or anode chamber) in combination with a counter electrode, preferably also embodied as a flow electrode, jointly form a flow cell according to the invention.

The charge/current output and/or current input can occur in a manner known per se by way of circulating the liquid dispersions (media) that can be pumped from the electrolyte container to the flow cell and back to the electrolyte container.

A particular embodiment (C) of the invention (B) relates to such an energy storage system, characterized in that it comprises at least one cathode flow electrode and at least one anode flow electrode, thus at least (or preferably) two flow electrodes and at least two different pumpable dispersions. The advantage here comprises that in flow electrodes, arranged in pairs, a fresh supply is possible of unused (at least partially, preferably practically completely "charged") pumpable dispersions.

A preferred variant of the embodiments (B) and (C) relates to such a storage system, which for the separation of the positive and the negative collector terminals comprises at least one ion-permeable diaphragm, preferably a single one.

Another preferred variant of the embodiments (B) and particularly (C) relates to such a storage system, which comprises at least one non-conductive spacer, preferably having gaps filled with electrolyte for the separation of the positive and the negative collector terminals.

A planar shape with a single exterior, closed, (continuous) border leads particularly to an almost or completely planar form, but also potentially a form deviating from the completely planar one, e.g., a wave-like form, comprising pores, comprising channels, having bends, having folds, or being equipped with two or more of these features). In other words, this relates particularly to an (essentially) planar, singly bordered shape. Planar relates particularly to the presence of two axes, positioned perpendicularly in reference to each other and parallel to the largest planar extension, with their length in reference to the thickness of the respective collector, perpendicular through these two axes (gross thickness over all possible elevations, such as waves and the like) amounting to 3 or more to 1, preferably 5 or more to 1, particularly 10 or more to 1.

In all above-mentioned embodiments of the invention the particles have an average grain size distribution from 1 nM to 500 µm, preferably from 1 nM to 1 µm, particularly from 1 nM to 250 nm, primarily from 1 nM to 100 nm.

The particles can be produced according to methods common for nano-scaled particles. Without being restricted thereto, the methods may include, for example, high-energy ball milling, cryo-milling, attrition, severe plastic deformation (SPD), equal channel angular pressing (ECAP), multi-axis forging, (high) pressure torsion, rolling, or "bottom up" electrolytic precipitation, spark plug sintering (SPS), mechanic alloying, or hot-isotactic pressing. Additionally considered are methods such as cyclic extrusion compressing or accumulative roll-bending (ARP). Non-porous nano-structured particles may for example be yielded by SPD, crystallization from amorphous polymer, or electrolytic precipitation. Important methods also include chemical vapor deposition (CVD), pulsed laser vaporization (PLV), carbon arc synthesis (CA), and sol-gel methods.

The average grain size distribution can be determined by grain size analysis according to common methods, such as by the scattering of laser light at the particles, which varies depending on particle size, or via digital image processing or electron microscopy, or by allowing particles to precipitate in a water column (coarse particles precipitate faster than fine ones) and regularly determining the density of the suspension (using a densimeter) or determining the weight of the precipitated particles (sediment scale). The data for the grain size distribution provide the average value.

The term "pumpable" means to be liquid, particularly at application temperatures (e.g., in the range from −50 or −20 to +100 or +60° C.). Preferred is a pressure of 1 to 3 bar.

The preferably liquid pumpable dispersions (provided as a fluid), include particles storing the electric energy (capacitively and/or chemically), are each present as a dispersion (particularly a suspension), with the positively charged and the negatively charged particles each being dispersed in a liquid carrier material. For the production of these dispersions it is important to moisten the agglomerates of the solid components (particularly the particles) such that the individual parts are dispersed independent from each other in a stable fashion. For this purpose, preferably known wetting and/or dispersing agents are used, known per se. The goal is to yield a homogenous dispersion without any agglomerates, showing a fine particle distribution and good storage stability, without any sedimentation of the solid components.

These dispersions can preferably be produced by mixtures of electrolyte solution and perhaps the wetting and/or dispersing agents according to the rotor/stator principle, or by homogenizing with a high pressure split homogenizer. Here, it is important to yield a distribution of the particles as fine as possible. Dispersing and wetting agents are suitable substances, known to one skilled in the art, which "dock" at the particles and protect them from agglomeration, as well as substances creating a (e.g., gel or net-like, also thixotropic sol/gel) structure in the liquid phase so that any sedimentation of the solid substances is prevented.

In the (preferred) use of the chemical energy storage (electrochemical principle, principle of batteries) particles of suitable sizes are provided from anode and/or cathode materials commonly known for the pumpable dispersion. For example, the substances named in DE 697 22 258 T2 or DE 10 2007 061 618 may be used as cathode material or anode material, which are here included by way of reference, or other materials noted in the following:

Positive electrode materials (cathode materials), i.e. charge carriers charged or to be charged positively are known per se. However, any known cathode material can be used, in general, such as for example implemented in lead, nickel-cadmium, nickel-metal-hydride, nickel-iron, silver-zinc, or lithium-batteries. Similarly, capacitive charge carriers, such as iron, aluminum, copper, tantalum, niobium, alloys with one or more thereof, and/or oxides of the above-mentioned metals or alloys, or graphite, or modified carbons may be used, applied in a manner known by one skilled in the art for capacitors.

Preferred cathode materials, i.e. charge carriers positively charged, are for example lithium-metal oxide; such as lithium cobalt dioxide ($LiCoO_2$), lithium nickel dioxide ($LiNO_2$), the Spinell lithium manganese oxide ($LiMn_2O_4$), lithium nickel cobalt aluminum oxide, lithium nickel cobalt manganese oxide, lithium iron phosphate, nano-spheres of lithium iron phosphate coated with Li-phosphate glass, sulfur embedded in graphite, sodium, sodium lithium and/or sodium potassium. These cathode materials can also be used as mixtures of two or more of these materials, particularly the mentioned ones, or as coatings of otherwise preferably inert materials, such as fine-particular carbon. Such materials are known to one skilled in the art.

For example the cathode material may comprise $LiCiO_2$, $LiNO_2$, $LiMnO_2$, lithium ferrous-oxide, or the like, or mixtures of two or more of them in the form of particles (also only as the exterior layer of respective particles, which may include a different core).

Negative electrode material (anode materials), i.e. negative charge carriers, are also known per se. Generally, each of these anode materials may be used, as for example in lead, nickel-cadmium, nickel-metal hydride, nickel-iron, silver-zinc, or lithium batteries, such as for example iron, aluminum, copper, tantalum, niobium, alloys with one or several thereof, and/or oxides of the above-mentioned metals or allows, or graphite, modified carbon or activated carbon, as used for capacitors in a manner known to one trained in the art.

Preferred anode materials are graphite and/or silicon, their modifications, lithium-titanate ($Li_4T_5O_{12}$), nano-structured Li-titanate, and/or lithium. These cathode materials can also be used in mixtures of two or more materials, particularly the named ones, or as coating of an otherwise preferably inert material. Such materials are known to one trained in the art. The particles may be present here in the form of pure compounds or as mixtures of materials, for example also with an inert conductive or non-conductive material, coated with one of the above-mentioned compounds or metals. Particularly preferred is a silicon/$SiO_x$/carbon—composite, as described for example in DE 10 2007 061 618 A1.

The anode material may include, for example metallic lithium, indium-lithium alloys, lithium-aluminum alloys, graphite, Si/$SiO_2$/C—nano-composites or lithium-iron phosphate on fine-particular carbon, or the like, or mixtures or two or more of them.

The particles are here dispersed in an electrolyte solution, preferably an anhydrous one.

Any liquid may be used as the carrier material for the production of the cathode liquid and/or anode liquid, which is used as the electrolyte solution, for example in lead, nickel-cadmium, nickel-metal hydride, or lithium batteries, or for example also in electrolyte capacitors or double-coat capacitors. They are known to one trained in the art.

For example, aprotic solvents can be provided as solvents, such as cyclic carbonates, such as alkylene carbonate, such as ethylene carbonate or propylene carbonate, dialkyl-carbonates, such as dimethyl carbonate, ethyl methyl carbonate, nitriles, such as acetonitrile or 3-methoxy proprionitrile, dimethoxyethane, diethoxyethane, tetrahydrofurane, 2-methyl tetrahydrofurane, gamma-butyrolactone, or dioxolane, or mixtures of two or more thereof.

In case of the (at least primarily) chemical energy storage the pumpable dispersions (cathode liquid or catholyte, anode liquid or anolyte) represent one electrolyte solution each, comprising the liquid carrier material in which an electrolyte is dissolved. Here, salts as electrolytes, such as lithium perchlorate, lithium hexafluorophosphate ($LiPF_6$) (preferred), lithium hexafluoroarsenate, lithium tetrafluoroborate (($LiBF_4$) (preferred), $LiCF_3CO_3$, methide, $LiN(CF_3SO_2)$, or lithium borate, or mixtures of two or more thereof, particularly the ones marked as preferred, may be provided.

The pumpable liquid media, comprising the cathode liquid and the anode liquid, each form a dispersion (separately or jointly in mixtures), each of which comprises the charge carrier positively charged or to be charged and/or the charge carrier negatively charged or to be charged in a form dispersed in the liquid carrier medium (comprises=including), with this carrier material particularly representing an electrolyte solution. Preferably a wetting or dispersing agent is used for the production of this dispersion. Substances that can be used are, for example: alkyl benzene sulfonate, pyrogenic silicic acid, modified silicic acids, modified phosphate-idylcholine, lecithin, and/or membrane lipid, or other materials known to one skilled in the art, including mixtures of two or more of these materials.

The positive and/or negative electrode materials used as pumpable dispersions each form a dispersion with the respective charge carriers as particles or as a component of particles. Here, the weight ratio of dispersed particles to (":") liquid carrier material (e.g., electrolyte solution) is not critical. In principle, any ratio may be selected, however an energy density as high as possible is desirable for the dispersions. On the other hand, the dispersions shall be easily flowing and the particles should not precipitate over an extended storage period. For example a weight ratio of particle:carrier liquid from 1:99 to 80:20, preferably a weight ratio of particles from 30 to 90, particularly from 60 to 80 percent by weight may be provided in reference to the overall weight of the dispersion (positive or negative electrode material).

In the presence of a solid electrode instead of a flow electrode, solid conductive amorphous electrolytes may also be used, e.g., shown as $0.6Li_2S$—O, $4SiS_2$, or solid electrolytes such as $Li_3PO_4$—$Li_2S$—$SiS_2$, $LiJ$-$Li_2S$—$B_2S$, $Li_2SP_2S_6$ or $LiJ$-$AlO_3$, or mixtures of two or more thereof.

When using the purely capacitive energy storage the particles are differently charged, for example first particles different from second particles. For example, first (e.g., aluminum) particles with a first average grain size, for example 50 μm in a non-conductive medium, such as liquid paraffin oil or one of the solvents for electrolyte solutions without additional electrolyte, are dispersed and, in case of the use of oppositely charged particles, stored separated from for example second (e.g., also aluminum) particles with a second grain size different from the first one, for example 300 μm in a non-conductive medium, such as liquid paraffin oil. Suitable stabilizers may be added for the dispersion.

For example, if the dispersion with the first (for example 50 μm) particles is conducted via one flow electrode of a energy storage system according to the invention with two oppositely charged/to be charged flow electrodes, which are connected to a negative terminal of an electric power source, and the dispersion with the second (e.g., 300 μm) particles is conducted through the other flow electrode, which is connected to the positive terminal of an electric power source, then the two dispersions charge differently. Both differently charged dispersions may be stored separately (cf. FIG. 1) or mixed immediately after leaving the flow cell (cf. FIG. 2), without any quantitative exchange of charge occurring between the particles. If the mixture is fed back to the energy storage system according to the invention for discharging the particles, prior to entering the respective flow electrode, they must be separated again so that the particles with the first grain size distribution are conducted through one flow electrode and the particles with the second grain sized distribution through another flow electrode in order to here allow the discharge of their charge upon contacting the conductive surfaces. This separation of the particles can be performed due to their different size and/or different inertia in a simple fashion, as described in the following for the embodiment (D) of the invention. When the particles are not mixed but stored and fed separately the diameters of the particles may also be identical.

A similar process may be applied when using the principle of the double-layer capacitor; however, here using an electrolyte solution, for example a cathode or anode liquid as described above and in the following: In this form of use of the capacitive energy storage the particles are charged differently such that they have a different charge on their outside than on their inside. Here, suitable particles (such as modified) carbon particles, e.g., activated carbon, are dispersed having a first average particle diameter of e.g., 50 nm, in an organic electrolyte or one based on water. When this dispersion is now conducted through one (as in the embodiment of the invention (A)) or (at least) one pair of flow electrodes of the energy storage system according to the invention, connected to the positive or negative terminal of a source of direct current, the electrochemical double-layers (Helmholtz-layers), known per se, can form around the particles. Differently charged dispersions may be stored in separate containers and when needed returned to one (embodiment (A) of the invention) or one or (at least) one pair of flow electrode(s) of an energy storage system according to the invention in order to here discharge their charges upon contacting the collectors within the formed flow cells. An asymmetrical arrangement is also possible, in which only one electrode of the electrode material is included as the pumpable dispersion while the other one remains static.

Particularly interesting materials for particles within the scope of the application of the capacitative principle are for example carbon in various modifications (relatively low pseudo-capacity by Faraday reactions), such as activated carbon, surface-treated glassy carbon, or the like, but also metal oxides, such as $RuO_2$, or further electro-active redox-polymers. Used as electrolytes are those mentioned for the other electrolyte solutions in this disclosure, for example quaternary salts such as tetra ethyl ammonium borotetrafluoride or methyl-triethyl-ammonium borotetrafluoride (TEABF) in acetonitrile, propylene carbonate, ethylene carbonate, dimethyl carbonate, γ-butryolactone, tetrahydrofurane, or carbonate mixtures as solvents, but also (with frequently lower interior resistance) aqueous electrolytes, such as KOH or $H_2SO_4$.

It is also possible for the chemical storage of the electric energy (for example according to the battery principle, as particularly described in the following) to be combined with the storage of electric energy according to capacitive principles, e.g., the principle of the double-layer capacitor, by pumpable dispersions forming around the cathode and/or anode particles in double-layers known per se.

Frequently, capacitive and electro-chemical contributions to the energy storage and discharge cannot be completely separated in the systems according to the invention so that stating an amount not mandatorily means that the other one does not play at least a certain role, here.

It shall be mentioned that the name "cathode" and "anode" in the present disclosure of the invention is based on the convention that materials (negative terminal) releasing in the charged state electrons to an exterior circuit are called anodes/anodic, while substances (positive terminal) accepting electrons are called cathodes/cathodic, because during the charging process anions (e.g., $Li^+$, which during charging is discharged into Li) move to the anode, and cations to the cathode.

"Positive" or "negative" respectively represent the charge in the charged state in reference to the corresponding counter electrode.

Another embodiment (D) of the invention relates to a positive electrode material (catholyte or cathode-liquid) or a negative electrode material (anolyte or anode-material), which comprises the respective (appropriately charged or chargeable) particles (charge carriers) dispersed in a liquid carrier material, with the particles having an average grain size distribution from 1 nM to 1 μm, particularly from 1 nM to 250 nm, primarily from 1 nM to 100 nm.

The respective pumpable dispersions may be stored separate from the dispersions of the respectively opposite (relative) charge in tanks or chambers within tanks. However, they may also be mixed in a tank to form a dispersion mixture when by a suitable surface coating and/or by suitable dispersion adjuvants (for example those causing a thixotropy) an exchange of charge is prevented within the dispersion mixture. Suitable dispersion adjuvants for preventing an exchange of charges may for example be tensides or structure-forming components, particularly modified silicic acids and/or alkyl benzene sulfonate. These boundary active substances coat the surface of each electrically charged particle so that for example an exchange of charges between two neighboring particles with a different electric charge can only occur by overcoming two protective layers. However, when the particles are made to contact the conductive surfaces of the electrodes in a targeted fashion only one protective coating must be overcome, so that the charging and/or discharging process can occur.

Another embodiment (E) of the invention therefore relates to a mixture of a positive and a negative electrode material, which includes a mixture of the respective particles (charge carriers) dispersed in a liquid carrier material, with the particles having an average grain size distribution from 1 nM to 1 μm, particularly from 1 nM to 250 nm, primarily from 1 nM to 100 nm, and comprising a coating or a dispersion adjuvant, particularly as mentioned in the previous paragraph.

Preferably, anode and cathode-liquids are produced and stored separately (embodiment (D)). However, according to the embodiment (E) it is also possible to produce the cathode and anode-liquid separately as dispersions, subsequently mix them, and then store them. Further, it is possible to produce and store the cathode and anode-liquids as dispersions directly in the mix. Here it must be observed that the wetting or dispersing agent and the amount of the added wetting and dispersing agent ensure sufficient separation of the positively and negatively charged particles, in order to prevent any exchange of charge within the dispersion. When for example anode and cathode particles show clearly different diameters, they can be easily separated before they flow into and/or through the flow electrode. After passing the charging or discharging device both dispersions can flow back together and be stored in one tank.

The separation of the dispersed anode-particles from the dispersed cathode-particles may occur by various separation methods known per se. For example, they can be separated from each other by different size, density, or magnetic features.

When the positive and negative electrode materials are provided as a mixture it is important that the respective two particle types, before they are fed to the flow cell, are distinguishable by at least one of the following parameters: (i) different size, (ii) different density, and/or (iii) different ferromagnetic features.

Suitable separation techniques and devices are, for example, using respective sieves, hydro-cyclotron separators or magnetic separators (if the particles exhibit ferromagnetic features) or other techniques, used in analytic devices are known to one skilled in the art.

A storage system according to the invention then additionally comprises a respective particle separation unit, which prior to feeding the anode and the cathode-flow electrode, allow the separation of the respective electrode materials.

In another embodiment of the invention the particle separation unit may be combined with the flow electrodes. Here, in the combined device both the separation as well as the charging and/or discharging occurs by the positive and the negative collector terminals being provided as contact surfaces of the electrodes in the separation device. Here, for example the particles precipitate in a cyclone separator due to different density, inertia, and/or size at different areas of the particle separator, in which simultaneously the charge exchange occurs. Separate flow cells with flow electrodes and an ion-permeable diaphragm or spacer are therefore not required.

Another embodiment (F) of the invention relates to a method for discharging electric energy, in which at least one, preferably at least a pair of oppositely charged electrode materials in the form of pumpable dispersions including particles that store electric energy (capacitively and/or chemically), are continuously and/or discontinuously transported (e.g., pumped) through at least one of the flow electrodes, preferably a pair of oppositely charged flow electrodes provided, and the charge is discharged by the corresponding positive and/or negative collector terminal or terminals. Here, it may be provided that the positively and/or negatively charged electrode material(s) are used as a mixture of oppositely charged particles, which prior to passing through the respective flow electrodes are separated by a particle separation unit, as described above. The particles discharge their charge via the positive and/or negative collector terminals. The discharged current may here also be emitted to one or more consumers.

For the purpose of charging, inversely in reference to the embodiment (G) of the invention, a method may be provided in which, in the inverse polarity compared to the embodiment (F), at least one, preferably at least one pair of oppositely charged electrode materials in the form of pumpable dispersions including particles storing electric energy (capacitatively and/or chemically), are continuously and/or discontinuously transported (pumped) through at least one of the flow electrodes, preferably at least one pair of oppositely charged flow electrodes provided, and the charge is here fed from a power source via the corresponding positive and/or negative collector terminal. Thereby the particles are charged. For the purpose of discharge/release they may be fed to the flow electrode or electrodes according to the method mentioned as embodiment (F).

Advantageously, the supply of the dispersions occurs in the method according to the invention under pressure, for example 1 to 3000 bar, e.g., from 100 to 1000 bar, or from 1 to 20 bar, pressed through the preferably porous materials embodied as discharging collectors of flow electrodes of the energy storage systems according to the invention in the form of flow cells, in order to ensure shearing forces as high as possible and a contact of the particles with the collector surfaces in the flow electrodes as high as possible. The liquid feeding device(s) (e.g., pump(s) can also be provided downstream in reference to the flow electrodes so that a certain vacuum can develop.

The dispersion(s) can for example (particularly in case of particles obtained by way of separation from mixtures of cathode/anode liquids) be pressed through a narrow gap using pressure and then impinge the charging or discharging surfaces (positive or negative collector terminal) with high speed, similar to a high pressure split homogenizer. An exposure to ultrasound may also be provided. The cavitations occurring in both cases briefly fracture the films adhering to the surface of the particles (e.g., wetting or dispersing agents or Helmholts-double layers) so that a direct contacting of the conducting surface occurs. This is particularly important when well-adhering dispersing agents are used. It is generally sufficient for the dispersion to be mandatorily guided along a conductive surface with a certain pressure, so that as many particles as possible come into contact with the conductive surface in order to release and/or accept the charge. Roughened surfaces, similar to the surfaces of a heat exchanger, made from good electrically conducting materials, such as copper or aluminum, can improve the contact.

A surface receiving or emitting charges as a positive collector terminal and a surface receiving or discharging charges as a negative collector terminal mean that the respective surfaces act in a charge-supplying fashion during the charging process of the particles, in a discharging fashion when discharging energy. The respective collectors may be connected (in a form-fitting, force-fitting, or material-fitting fashion), for example via suitable power conductors, such as wires, or otherwise via circuits with consumers, such as electric engines, etc., without this being mentioned each time.

In the case of flow electrodes the materials for the positive and/or negative collector terminals may be embodied such that they only contact the respectively charged particles at their exterior surfaces, or they may be embodied porous or equipped with channels, for example, such that they are penetrated entirely or partially by the respective pumpable dispersion, (e.g., when one of the sides must be permeable for the particles, such as when at least one spacer is provided instead of an ion-permeable diaphragm), with the pores (in case of an otherwise impermeable side) must be permeable for the particles in order to allow the full use of the surfaces. In particular, the collectors may then be embodied as elements filling the respective flow electrode entirely or partially, particularly in the form of metal foams, sintered metal powder, or fine sintered spheres, e.g., copper granulate, made from a fibrous web, for example comprising copper, aluminum, or graphite fibers, metal sponges produced by etching or otherwise, e.g., from aluminum, or from an electrically conductive material, such as metal, e.g., comprising copper or aluminum, coated with an organic or ceramic material having good permeability for the pumpable dispersions, preferably an open-pored material, as in EP 1 808 241, which is hereby incorporated by way of reference. This enlarges the surface and thus the potential current that can be achieved with the appropriately equipped energy storage system according to the invention.

A particular embodiment according to the invention relates to an energy storage system according to the invention, in which the (positive and/or negative collector) terminal or terminals may be embodied as plates comprising a conductive material, e.g., carbon (e.g., graphite) or metal plates (particularly comprising aluminum or preferably copper or another suitable metal, with at the side of the respective collector plate (for example by cutting, etching, or the like) surface-parallel channels (channel-like indentations) are formed in order to yield a particularly large surface, arranged e.g. snake-like, with curves or folds, or otherwise (for example parallel in reference to each other), with here they may for example be accessible by the feed from a recess area provided in the edge region of the respective collector material such that the pumpable dispersion(s) can be pumped through the channels, with then the surface of the respective collector equipped with one or more channels being arranged in an energy storage system according to the invention such that the channels face the (mandatory) ion-selective diaphragm and are sealed thereby towards the outside from dispersion(s) that can be pumped so that (in the finished installation state) one or more closed channels are provided for guiding the electrode materials (dispersions).

This allows that the respective pumpable dispersion that can be pumped under high contact with the surfaces through the respective collectors, simultaneously permitting a very simple production. By a respectively high pressure and/or high pumping speeds of the electrode material, particularly when curves or folds are present in the channel or channels, the contact of the particles of the pumpable dispersion to the respective collector can be facilitated (centrifugal and shearing forces) and this way the efficiency of the energy discharge can be increased, which is a part of a particular embodiment of the method according to the invention for discharging electric energy.

In another special embodiment, particularly for the energy storage according to the lithium-battery principle, it is provided that one flow electrode is equipped with a positive collector terminal made from sintered copper granulate, as known for example from liquid filters, the other flow electrode with a negative collector terminal made from an open-pored metal foam comprising an aluminum alloy, such as described in EP 1 808 241 A1 (which is hereby incorporated by reference), particularly filled at least almost entirely. This way, the surfaces of the electrodes are considerably enlarged, which ensures a better contact to the particles with the electrodes included in the pumpable dispersions.

By way of serial connecting (stacking) of flow cells and/or suitable materials the desired voltage can be achieved, as well as by way of parallel connecting the amperage suitable for the respective purpose.

The amount of energy generated and/or potentially generated can be controlled by the amount of positive and/or negative electrode materials provided as a pumpable dispersion.

Additional potential, common elements of the energy storage system according to the invention, such as power lines, insulations, and the like are a matter of course for one skilled in the art and are therefore not described in greater detail.

The specific definitions of more general terms used above and in the following may replace individual, several, or all more general terms in each embodiment of the invention, which leads to particular, for example beneficial embodiments of the invention.

BRIEF DESCRIPTION OF THE DRAWINGS

FIG. 1 shows the schematic design of an energy storage system according to the invention with a separate storage (in the charged state) of a positive electrode pumpable material (cathode dispersion) and (in the charged state) negative electrode pumpable material (anode dispersion) in a cross-section (with a top view of the containers (1) and (2)).

FIG. 2 shows the schematic design of an energy storage system according to the invention with a mixed storage of positive electrode pumpable material (cathode dispersion) and negative electrode pumpable material (anode-dispersion) in a cross-section (with the container (9) shown in a top view).

FIG. 3 shows schematically the enlarged cross-section of a flow cell according to the invention, in which the discharging collectors directly contact the ion-permeable (separator) diaphragm.

FIG. 4 shows schematically the enlarged cross-section of a flow cell according to the invention, in which the discharging collectors comprise metal foams, connected directly to discharging collectors (e.g., films), which are separated from each other by spacers.

FIG. 5 shows schematically the enlarged section of an energy storage system according to the invention in which one electrode material is provided in a liquid form, and the other one in a fixed (solid) form.

FIG. 6A illustrates schematically an energy storage system according to the invention with collectors comprising channels in a top view, with sections located below the plane of the paper being shown hatched. FIG. 6B shows schematically a combination of two collectors, similar to A, placed on an ion-permeable diaphragm (cross-section in the direction of the arrow in FIG. 6A).

DETAILED DESCRIPTION OF THE PREFERRED EMBODIMENTS

The following examples illustrate the invention without limiting it.

Example 1

FIG. 1 shows in a cross-section a preferred energy storage system according to the invention with a separate storage of positive electrode material (cathode dispersion) and (in the charged state) negative electrode material (anode dispersion), each in the form of a pumpable dispersion of particles, as mentioned above. The positive and the negative electrode material are located in separate containers (1), (2), apart from each other, and are transported via liquid transportation devices (8), here in the form of pumps, which alternatively or additionally may also be provided downstream in reference to the flow cell with connection to the outlet, and a feed line of a flow cell, which comprises a cathode flow electrode (3), and an anode flow electrode (4), and therebetween an ion-permeable diaphragm (5), which is permeable by ions in the electrolyte in the electrode materials, however not for charged particles dissolved therein. Not shown are the positive and negative collector terminals (cf. e.g., (10) and (11) in FIG. 4) discharging. In this configuration with charged particles the flow cell serves as the power source.

It is not shown (which is applicable for the other embodiments according to the invention) that in a particular preferred embodiment of the invention the containers may be embodied as double-tanks with a fixed exterior housing, which contain in their interior at least two flexible interior tanks, with each of the interior tanks comprising fill and drain connectors, which may be fastened to the fixed, exterior tank. Here, each of the flexible interior tanks has a volume at least of such size that it can fill the entire fixed exterior tank. When for example one flexible interior tank according to the invention is filled with charged electrode material according to the invention, that can be pumped, the second flexible interior tank is present in a collapsed state and taking up only little space. During the discharging process of the system now the charged electrode material that can be pumped is pumped out of the tank, passes the flow cell, here (at least partially) discharges, and is then pumped into the second flexible interior tank. The second flexible interior tank fills corresponding to the first interior tank (initially full) with the charged electrode material being emptied. When filling in fresh electrode material, in the same fashion the discharged pumpable dispersion is pumped out and can be recycled (recharged externally and then refilled into a tank). This way, any ventilation of the tank system is unnecessary and the risk of environmental humidity and oxygen entering is avoided. Additionally, no additional reservoir for "used" (discharged) electrode material is required. This system of two flexible interior tanks inside an exterior container is additionally advantageous such that it can be retrofitted in existing tanks.

In general, the exterior fixed tank may of course also be replaced by a flexible housing. It is not required that it has a completely closed housing, but may be embodied perforated, for example to save material. Instead thereof, in general a support device may also be provided for both flexible tanks.

Any flexible materials and/or films resistant to electrode materials may be considered as materials for the interior tanks. Preferred are polymer materials, such as rubber, silicon, polyethylene, polypropylene, polyamide, or similar organic polymers. Coated or laminated films may also be provided. One skilled in the art knows such suitable materials. The materials may also be coated at the inside, for example by metal vapors. Metal bags are also possible, for example made from metal foils.

By applying a voltage via a power source (7) "used" uncharged particles can be recharged, then practically the polarization is reversed and the charged electrode materials are fed to the containers (1) and (2). This way a reversible charging and discharging is possible and the flow cell serves alternating as the power source and the charging device for the particles. However, alternatively finished pre-charged electrode material with the appropriate charge may also be filled (tanked) into the containers (1) and (2) so that it is possible to quickly yield an energy storage system according to the invention able to emit a charge and available for power generation. Instead of waiting a long time for charging, for example a vehicle can quickly be tanked and the travel can be continued, similar to present gasoline vehicles, without any extended charging cycle. Here the dispersions can be charged separately and be held available for filling the tank.

Such devices are known from prior art, in which however the discharging positive and negative collectors (10) and (11) (not shown in FIG. 1) are located relatively far apart from the ion-permeable diaphragm (5). This leads to increased interior resistance. This problem can be advantageously addressed such that the discharging positive collector terminals (1) and the negative collector terminals (11) are located closely together without resulting in any short circuiting.

A first respective arrangement according to the invention is shown in FIG. 3: here the discharging collectors are arranged (for example approximately) in the middle between the two half-cells of the flow cell and directly contact the ion-permeable diaphragm (5) arranged therebetween. For example, the collectors (as shown in FIG. 3) may be embodied as conductive open-pored metals, such as metal foams (3), (4), or sintered metals.

In such an arrangement the separation of the electrode materials of the cathode flow electrode and the anode flow electrode provided as a pumpable dispersion occurs by the ion-permeable diaphragm. It may not allow any charged particle to pass, however it can be permeable for the electrolyte solution and must be at least permeable for ions. The electric charges are directly removed (discharged) or supplied (charged) via the collectors, here in the form of metal foams. By the foam-like embodiment of the collectors a large surface is yielded, allowing the utilization of the charge of the particles into the pumpable dispersion to a large extent. In order to keep the interior resistance of the energy storage system according to the invention as low as possible, particularly in the form of pure flow cells (flow electrodes for both polarities) the ion-permeable diaphragm (also more generally called separator diaphragm) may be very thin and the distance between the positive and the negative collectors may be kept very short. An advantageous variant according to the invention therefore positions the collectors and the ion-permeable diaphragm or the spacers in the middle between two oppositely poled flow electrodes (FIGS. 1 to 4). A separator diaphragm or spacer, equipped on one side with a positive collector terminal for discharging the positive charge and on the other side with a negative collector terminal, is flown through on one side with the positive electrode material, on the other side with the negative electrode material, with the corresponding dispersed particles of the respective pumpable dispersions made to contact the conductive surfaces. The unit comprising the positive collector terminal/separator diaphragm or spacer/negative collector terminal comprises pores allowing the electrolyte solution to pass, however being at least ion-permeable without allowing the particles to pass to the respectively oppositely charge cell. Thus, the pores must be smaller than the particle size in the respective pumpable dispersions. Such units may be produced, for example, according to a method according to the invention, by a separator film (ion-permeable diaphragm or spacer) from a fiberglass web, a ceramic film, or for example an ion-permeable polymer film, at both sides coated with a metal powder as the collective material. Alternatively, for example a perforated aluminum film (as the collector) may be provided on one side with an ion-permeable layer (e.g., laminated or coated), or on one side by way of oxidation a very thin oxidized layer is formed in a targeted fashion, which then is adhered with the side of the oxide layer to another perforated metal film. The holes or pores of the metal film (as collectors) must be smaller than the particle sizes of the dispersions.

By such or a different arrangement of the discharging collectors with an electrolyte-permeable feature the capacity of energy storage systems according to the invention in the form of flow cells is considerably increased.

Instead of an ion-permeable diaphragm, the separation of the dispersion of the electron materials that can be pumped can also occur by the collectors (10), (11) themselves. FIG. 4 shows this as an example: Here, the discharge-conducting collectors (10), (11) are separated by non-conductive spacers (12) in order to avoid short-circuiting. The collectors (10), (11), here for example embodied in the form of metal foil, are porous such that they are impermeable for the particles present as electrode material in pumpable dispersions, however, permeable at least for ions of the electrolytes in which the particles are dispersed. The collectors (10), (11) are in a direct contact or are a component of porous conductors such as metal foams (3), (4) allowing for the pumpable dispersions to pass. The collectors (10), (11) can also comprise a sintered, electrically well conductive material, a fleece, or a web or a perforated film with the above-mentioned features of permeability.

The positive collector terminal and the negative collector terminal (10), (11) are kept at a distance by non-conductive spacers (12), in order to prevent short-circuiting. Ions present in an electrolyte allow a charge to flow between the spacers or within their interior. The spacers may be present made from an ion-permeable film (preferably comprising recesses), tissue, or fleece (e.g., fiberglass web or fiberglass fleece), by non-conductive powders, by partial (preferred) or full-cover coating of at least one of the collectors (10) or (11), with the coating may also be an adhesive, and/or created by a partial (preferred) or a full-cover oxide layer on the surface of at least one of the collectors (10), (11).

The discharge conducting collectors (10), (11), particularly in the form of foils, may particularly in the embodiments according to FIGS. 3 and 4 also be produced by a coating or printing of an ion-permeable diaphragm or a planar spacer with a metal or another conductive material, with the respective diaphragm or the spacer may be coated at one side or at both sides, which results in a particularly easy production.

Example 2

FIG. 2 shows an example for another embodiment of the present invention. Here, an energy storage system according to the invention is shown, in which the oppositely charged electrode materials are present in the form of pumpable dispersions mixed together in a single container (9) (e.g., a tank). A particle separation device (6), for example in the form of a sieve, hydro-cyclone separator, or (in case of magnetically traceable, e.g., ferromagnetic particles) magnetic separators, cathode-flow electrodes (3), anode-flow electrode (4), ion-permeable diaphragm (5), liquid transportation device (8), here, e.g., in the form of a pump, and a power supply or consumer (7). The container (9) may also be embodied as a double-tank, as described in example 1.

Example 3

Another embodiment according to the invention is shown in FIG. 5 in the form of a schematically illustrated section of an asymmetrically designed flow cell: Here only the anode flow electrode (4) (or alternatively the cathode flow electrode (3), not shown) comprises the respective pumpable electrode material, while the opposite terminal represents a fixed terminal (locally fixed electrode) (13). The other elements, such as spacers (12), conductive negative collector terminal (11), (or positive collector terminal (10), not shown), are present as described above (e.g., for example 1, 2 or in the general part).

In all exemplary embodiments of the invention mentioned above and in the following the electrode materials present as pumpable dispersions are at least partially "charged" in the energy-supplying state and thus can supply a current (7), as consumers), in the energy-collecting state at least partially "discharged" and thus suitable ((7) as a power supply) for storing electric energy.

Example 4

Embodiment of the Invention with Positive and Negative Collector Terminals Having Channels at One Surface FIG. 6 shows an exemplary embodiment of the invention in which the collectors (10, 11) are embodied as metal (e.g., copper) plates, into which channels (17) (recesses) are inserted on one of the surfaces. FIG. 6A shows as an example such a collector (14) from the side, which in the operational state comes into contact with an ion-permeable diaphragm (5) (FIG. 6B without any seal (19)). In the installed state, the supply line and the drain line (15, 16) allow the supply of the pumpable dispersion to be fed and drained directly into the channels (17) and back out of them or via a collective recess (18) (reservoir). The shape of the channels (17), here shown in the form of snakes, as examples, allows particularly when pumping occurs under high pressure, a very good interaction of the charged or to be charged particles of the pumpable dispersion and thus a good exchange of the charge (e.g., by way of shearing forces, impact onto surfaces, turbulences, or the like). Seals (19) may be provided, in order to contact the collectors in a sealing fashion for example in areas in which no ion-permeable diaphragm (5) is provided.

Example 5

Production of an Electrode-Dispersion (A) 500 g of the negative electrode material lithium titanate ($Li_4Ti_5O_{12}$) with an average particle size from 2 to 3 µm and a specific electrochemical capacity (charge amount) of 155 mA/g is added to 500 g of an electrolyte solution, which comprises (a) ethylene carbonate, (b) propylene carbonate, (c) dimethyl carbonate, or (d) a mixture of ethylene carbonate, propylene carbonate, and dimethyl carbonate (at a volume range 1:1), in which prior to the addition of the negative electrode material, the lithium salts lithium hexafluorophosphate ($LiPF_6$) and lithium tetrafluoroborate ($LiBF_4$) are dissolved to saturation at room temperature (23° C.) as well as 10 g wetting agent alkyl benzene sulfonate. The preliminary mixing of the powdered anode material used here in the electrolyte solution is now pumped with 600 bar through a high-pressure split homogenizer (APV Gaulin 110 T, APV Gaulin GmbH, Langenhagen, Germany) in order to yield a fine distribution and a good wetting of the particles.

(B) Similar to section (A), a positive electrode material is produced as a dispersion, using 500 g of the cathode material lithium ferrous-phosphate applied on a fine-particular carbon (C—$LiFePO_4$) with an average particular diameter of 0.5-1 µm and a specific surface of 12-18 $m^2$/g.

(C) The dispersion of (A) is filled into the container 2 of FIG. 1, the dispersion of (B) is entered into the container 1 of FIG. 1. The charging and discharging device (7) is schematically shown in FIGS. 1 and 2. An enlarged illustration of the electrode arrangement is shown schematically in FIG. 3. It comprises an open-pored aluminum foam plate as the positive collector terminal (3) and negative collector terminal (4) produced from sintered copper granulate. Both collectors, permeable to the dispersions, are directly compressed with a separator film (ion-permeable diaphragm (5)) made from ceramics, so that two chambers develop, through which the dispersions are pumped with the help of hose pumps as the liquid transportation device (8). During the pumping process, which is maintained for 10 minutes, direct current is applied from a power supply (7) to the collectors, with a considerable charging by the dispersions is measured. The amount of charge current increases with higher flow of the hose pumps. Subsequently the power supply is replaced by a power consumer and a current can be measured, e.g., 5 Ampere, in the inverse direction upon activation of the hose pumps (8). The dispersions return their stored charge back to the electrodes.

(D) In FIG. 2 both dispersions obtained from (A) and (B) are mixed in the tank as the container (9) and pumped via a pump as the liquid transporting device (8) through a particle separating unit (6), by which the electrode material of (A), due to its greater particle size (2-3 µm) is separated from the electrode material of (B) (particle size less than 1 µm). After the passing of the flow cell under charging both flows are reunited and fed to the container (9). The charging and discharging of the electrode materials occur in the same manner as described in (C).

Example 6

Ability of Nano-Scaled Electrode Materials for Charging and Discharging

In a test arrangement it is proven that electrode materials, comprising particles with a diameter measuring only a few nanometers and freely dispersed in an electrolyte solution, are capable of accepting an electric charge and to release it again.

Design of the Experiment

An arrangement of two half-cells in a cup-shaped vessel is produced as the cells which are separated from each other by ion-permeable diaphragms.

Coated, electrically conductive gas electrodes are used as collectors (conductive electrodes).

12 g electrolyte solution with the following composition was inserted into each chamber: 3-methoxy propionitrile, in which previously bi-(trifluoromethane)-sulfonimide-lithium-salt was dissolved to a concentration of 1 mol/l.

2 g nano-scaled lithium-cobalt-oxide powder (Sigma-Aldrich catalog no. 442704-A, Sigma-Aldrich Chemie GmbH, Munich, Germany) was added as the positive (to be charged positively) electrode material, dispersed in the electrolyte solution for the cathode chamber.

2 g graphite with an average particle size of 1-2 μm (Sigma-Aldrich, catalog no. 28, 286-3) was dispersed in the electrolyte solution for the anode chamber as the negative (to be charged negatively) electrode material.

Execution of the Experiment

First, the current was measured between the chambers of the electrolyte solution, however without any addition of electrolyte material. Here, a voltage of 3.6 V direct current was applied. Only a very low current of 0.5 μA could be measured.

As the next step, the electrode materials were inserted into the electrolyte solution and only agitated with a spatula (dispersed). When the same voltage of 3.6 V was applied in the correct polarity, immediately a current of 0.5 mA could be registered, which however considerably reduced after 10-20 seconds. When the dispersion was reagitated, the current considerably increased. Subsequently 2 g positive and negative electrode material each was additionally inserted into the electrolyte solutions and agitated (dispersed), so that the particle concentration doubled. After a voltage of 3.6 V was applied, now a current of 1 mA could be registered, which was equivalent to twice the current compared to the previous one.

Small magnetic agitators were introduced into the half-cells and ensured a continuous agitation of the liquids. The voltage of 3.6 V was now applied for approximately 20 minutes in order to charge as many particles as possible. After the voltage was switched off, a discharge current was clearly discernible for approx. 1 minute with a measurable voltage of 2.7 V.

With this relatively simple arrangement it can therefore be proven that the particles suspended in the electrolyte solution can accept and release a charge. The contact to the electrodes can be made by a relatively slight circulation of the suspensions. Electric charge can be inserted into the particles, stored here, and then released again. The experiment also shows that twice the concentration of the charge carriers results in a current twice as strong. It is also important that the particles of the dispersion must pass the electrically conductive electrodes by way of circulation in order to ensure rapid charging and/or discharging.

Example 7

Performance of a Capacitive Storage of a Charge According to the Principle of the Double-Layer Capacitor Condenser 200 g of surface-active activated carbon of the company TIMCAL S.A., Bidio, Switzerland, with an average particle size of 150 nm is finely dispersed by a high pressure split homogenizer of the trademark APV Gaulin (s.a.) in 800 g of a previously produced electrolyte solution. A saturated solution of tetra-ethyl ammonium borofluoride (TEABF) in acetonitrile is produced as the electrolyte solution.

The dispersion is now added in equal parts into the containers 1 and 2 of FIG. 1 and pumped, in the same manner as described in detail for example 5, through the charging and discharging device. For the charging process, a direct current of 2.5 V is applied during the pumping process for the duration of approximately 10 minutes at the collectors, with a considerable increase of charge being measured by the dispersion. The amount of charged current increases with a higher flow rate of the pump. Subsequently the power supply is replaced by a consumer and a current of several Ampere can be measured in the opposite direction when the pumps (8) are in operation.

LIST OF REFERENCE CHARACTERS

1 Container with positive electrode material
2 Container with negative electrode material
3 Cathode flow electrode
4 Anode flow electrode
5 Ion-permeable diaphragm
6 Particle separation unit (particle separation device)
7 Power supply or consumer
8 Liquid transportation device
9 Container
10 Positive collector terminal
11 Negative collector terminal
12 Spacer
13 Fixed electrode
14 Plate for collector
15 Supply line
16 Drain line
17 Channels
18 Collective recess
19 Seal
20 Line indicating cross-section in FIG. 6B

The invention claimed is:

1. A reversible storage system for electric energy, comprising a charging or discharging surface as a positive collector terminal (10) and a charging or discharging surface as a negative collector terminal (11) and a flow electrode (3, 4) with a pumpable dispersion, said dispersion comprising particles storing electric energy and at least one feed line and at least one drain line for the pumpable dispersion, the particles storing electric energy have an average grain size distribution of 1 nM to 500 μm and with the electric energy being at least partially stored capacitively in Helmholtz-double layers and both of the charging and discharging surfaces being in contact with the pumpable dispersion, with one of the charging or discharging surfaces coming into contact with the particles and being embodied such that a charge stored inside the particles is transferred thereto, while the other charging or discharging surface receives an opposite charge of a shell of the particles, or a reversible storage system for electric energy, comprising the charging or discharging surface as the positive collector terminal (10) and the charging or discharging surface as the negative collector terminal (11) and the flow electrode (3, 4) with the pumpable dispersion, said dispersions comprising particles storing electric energy in a capacitive and/or chemical fashion, with the particles having an average grain size distribution from 1 nM to 500 μm, and comprising the at least one feed line and the at least one drain line for the pumpable dispersion, with the storage system further comprising, for separating the positive and negative collector terminals, at last one ion-permeable diaphragm (5) or at least one non-conductive spacer (12), with a positive electrode material (catholyte or cathode-liquid) being in contact with the positive collector terminal (10) and a negative electrode material (anolyte or anode-liquid) being in contact with the negative collector terminal (11), and with each of the flow electrodes (3, 4) of said positive or negative electrode materials being included in the form of an appropriate pumpable dispersion, said electrode material forming, together with the other wall sections of the flow electrode and (i) with the respective collector (10, 11) and the ion-permeable diaphragm (5), or (ii) when instead thereof a non-conductive spacer (12) is provided, with the respective positive collector terminal (10) or with the respective negative collector terminal (12), a cathode and/or anode flow electrode (3, 4)

with the at least one feed line and, with the at least one drain line, a cathode and/or anode flow electrode (3, 4)

with the ion permeable diaphragm (5) or, when spacers (12) are used, the contacting collector (10, 11) being permeable towards a side of the spacers (12), not for the particles of the pumpable dispersion but for electrolytes, and with the positive and the negative electrode material being arranged in parallel to the ion-permeable diaphragm or parallel in reference to the arrangement of the spacers and parallel in reference to each other and are arranged on opposite planar sides of the ion-permeable diaphragm or opposite sides of the arrangement of the spacers such that on one side of the ion-permeable diaphragm or on a same side of the spacers only at least one positive electrode material and at least one positive collector terminal and on the opposite side only at least one negative electrode material and one negative collector terminal are provided, wherein the negative collector terminal and the positive collector terminal each have a planar form with a single exterior closed border and contact, with one of their planar sides each, the ion-selective diaphragm or the spacers, and the pumpable dispersion is arranged on the side facing away from the planar side of the respective collector contacting the ion-selective diaphragm or the spacers, where the pumpable dispersion may penetrate at least partially into the respective collector, with optionally for said storage system at least one additional container being provided, comprising the at least one of the pumpable dispersions, with a liquid transportation device and connection means being provided for transporting the pumpable dispersion from the container to the at least one feed line and from the at least one drain line of the respective flow electrode and back to the electrolyte container.

2. An energy storage system according to claim 1, further comprising at least one cathode flow electrode (3) and at least one anode flow electrode (4).

3. An energy storage system according to claim 1, further comprising, for the separation of the positive and negative collector terminals (10, 11), at least a single ion-permeable diaphragm (5).

4. An energy storage system according to claim 1, further comprising, for the separation of the positive and negative collector terminals (10, 11), at least one non-conductive spacer (12), comprising gaps filled with electrolyte.

5. An energy storage system according to claim 1, wherein the particles of the pumpable dispersions have an average grain sized distribution from 1 nM to 1 µm.

6. An energy storage system according to claim 1, wherein the pumpable dispersions include at least one of wetting or dispersing agents.

7. An energy storage system according to claim 1, wherein the pumpable dispersions each include at least one solvent and at least one electrolyte.

8. An energy storage system according to claim 1, wherein it comprises a cathode or an anode as the flow electrode and a fixed electrode as the counter electrode.

9. An energy storage system according to claim 1, wherein the energy storage occurs capacitively.

10. An energy storage system according to claim 1, wherein the energy storage occurs capacitively according to the principle of a double-layer capacitor via Helmholtz-layers.

11. An energy storage system according to claim 1, further comprising a particle separation unit (6) which allow the separation of positively and negatively charged ones of the particles during feeding to the energy storage system.

12. An energy storage system according to claim 11, wherein the particle separation unit (6) is provided combined with the flow electrodes (3, 4) such that in the combined device both the separation as well as the charging and the discharging can occur, by the positive and the negative collector terminals being provided in the separation device as contact surfaces of the electrodes.

13. An energy storage system according to claim 1, further comprising an ion-permeable diaphragm (5), with the positive collector terminal being provided directly at one side of the ion-permeable diaphragm, the negative collector terminal at the opposite side, with the discharging positive and negative collector terminals being embodied such that they only come into contact with the respectively charged particles on one of their exterior surfaces, or that they are porous or equipped with channels such that they are penetrateable entirely or partially by the respective pumpable dispersion; such that the positive and negative collector terminals at their side facing the ion-permeable diaphragm are equipped with one or more channels sealed by the ion-permeable diaphragm on the side facing the respective ion-permeable diaphragm, through which the pumpable dispersions can be guided.

14. An energy storage system according to claim 1, wherein no ion-permeable diaphragm is provided and the discharging collectors (10, 11) are perforated or porous such that the particles cannot penetrate the sides of the collectors facing each other and at least one spacer (12), but are penetrable by at least one of liquid of the pumpable dispersion or the ions dissolved therein.

15. A method for discharging electric energy, comprising:
providing a reversible storage system for electric energy, comprising a charging or discharging surface as a positive collector terminal (10) and a charging or discharging surface as a negative collector terminal (11) and a flow electrode (3, 4) with a pumpable dispersion, said dispersion comprising particles storing electric energy and at least one feed line and at least one drain line for the pumpable dispersion, the particles storing electric energy have an average grain size distribution of 1 nM to 500 µm and with the electric energy being at least partially stored capacitively in Helmholtz-double layers and both of the charging and discharging surfaces being in contact with the pumpable dispersion, with one of the charging or discharging surfaces coming into contact with the particles and being embodied such that a charge stored inside the particles is transferred thereto, while the other charging or discharging surface receives an opposite charge of a shell of the particles, or a reversible storage system for electric energy, comprising the charging or discharging surface as the positive collector terminal (10) and the charging or discharging surface as the negative collector terminal (11) and the flow electrode (3, 4) with the pumpable dispersion, said dispersions comprising particles storing electric energy in a capacitive and/or chemical fashion, with the particles having an average grain size distribution from 1 nM to 500 μm, and comprising the at least one feed line and the at least one drain line for the pumpable dispersion, with the storage system further comprising, for separating the positive and negative collector terminals, at last one ion-permeable diaphragm (5) or at least one non-conductive spacer (12), with a positive electrode material (catholyte or cathode-liquid) being in contact with the positive collector terminal (10) and a negative electrode material (anolyte or anode-liquid) being in contact with the negative collector terminal (11), and with each of the flow electrodes (3, 4) of said positive or negative electrode materials being included in the form of an appropriate pumpable dispersion, said electrode material forming, together with the other wall sections of the flow electrode and (i) with the respective collector (10, 11) and the ion-permeable diaphragm (5), or (ii) when instead thereof a non-conductive spacer (12) is provided, with the respective positive collector terminal (10) or with the respective negative collector terminal (12), a cathode and/or anode flow electrode (3, 4)

with the at least one feed line and, with the at least one drain line, a cathode and/or anode flow electrode (3, 4)

with the ion permeable diaphragm (5) or, when spacers (12) are used, the contacting collector (10, 11) being permeable towards a side of the spacers (12), not for the particles of the pumpable dispersion but for electrolytes, and with the positive and the negative electrode material being arranged in parallel to the ion-permeable diaphragm or parallel in reference to the arrangement of the spacers and parallel in reference to each other and are arranged on opposite planar sides of the ion-permeable diaphragm or opposite sides of the arrangement of the spacers such that on one side of the ion-permeable diaphragm or on a same side of the spacers only at least one positive electrode material and at least one positive collector terminal and on the opposite side only at least one negative electrode material and one negative collector terminal are provided, wherein the negative collector terminal and the positive collector terminal each have a planar form with a single exterior closed border and contact, with one of their planar sides each, the ion-selective diaphragm or the spacers, and the pumpable dispersion is arranged on the side facing away from the planar side of the respective collector contacting the ion-selective diaphragm or the spacers, where the pumpable dispersion may penetrate at least partially into the respective collector, with optionally for said storage system at least one additional container being provided, comprising the at least one of the pumpable dispersions, with a liquid transportation device and connection means being provided for transporting the pumpable dispersion from the container to the at least one feed line and from the at least one drain line of the respective flow electrode and back to the electrolyte container, wherein at least one of the electrode materials in the form of the pumpable dispersion is transported, with said dispersion comprising electric energy capacitatively and/or chemically stored in the particles, through at least one of the flow electrodes (3, 4) and the charge is guided through the corresponding positive and/or negative collector terminals (10, 11).

16. A method according to claim 15, wherein a supply of the dispersions occurs under pressure through the flow electrode (3, 4) of the energy storage system.

\* \* \* \* \*